US010721680B2

(12) United States Patent
Kodaypak et al.

(10) Patent No.: US 10,721,680 B2
(45) Date of Patent: Jul. 21, 2020

(54) METHOD AND APPARATUS FOR PROVIDING A VIRTUAL NETWORK FUNCTION IN A NETWORK

(71) Applicant: AT&T Intellectual Property I, L.P., Atlanta, GA (US)

(72) Inventors: Rajendra Prasad Kodaypak, Sammamish, WA (US); Vikram Seenappa, Sammamish, WA (US); Terry Figurelle, Redmond, WA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 439 days.

(21) Appl. No.: 15/135,092

(22) Filed: Apr. 21, 2016

(65) Prior Publication Data

US 2017/0311244 A1 Oct. 26, 2017

(51) Int. Cl.
*H04W 48/18* (2009.01)
*H04W 8/14* (2009.01)
(Continued)

(52) U.S. Cl.
CPC ............. *H04W 48/18* (2013.01); *H04W 8/14* (2013.01); *H04W 8/06* (2013.01); *H04W 8/08* (2013.01); *H04W 36/14* (2013.01)

(58) Field of Classification Search
CPC ................................ H04W 8/02; H04W 48/18
See application file for complete search history.

(56) References Cited

U.S. PATENT DOCUMENTS 7,082,604 B2 7/2006 Schneiderman
7,197,569 B2 3/2007 Dowling
(Continued)

FOREIGN PATENT DOCUMENTS

CA 2421609 3/2002
CA 2500639 4/2004
(Continued)

OTHER PUBLICATIONS

Susilo, Gatot, Andrzej Bieszczad, and Bernard Pagurek. "Infrastructure for advanced network management based on mobile code." Network Operations and Management Symposium, 1998. NOMS 98., IEEE. vol. 2. IEEE, 1998. https://www.researchgate.net/profile/Andrzej_Bieszczad/publication/3733980_Infrastructure_for_advanced_network_management_based_on_mobile_code/links/0046353a9fdb3610c0000000.pdf (pp. 3-5 and flow diagram on p. 6).
(Continued)

*Primary Examiner* — Un C Cho
*Assistant Examiner* — Yu-Wen Chang

(57) ABSTRACT

A method and apparatus for providing a virtual network function in a visited network are disclosed. For example, the method receives an attach request or a handover for a user endpoint device, determines a home network for the user endpoint device, receives a profile of the user endpoint device, determines a policy for providing a service to the user endpoint device in accordance with the profile, determines a set of virtual network functions needed for providing the service to the user endpoint device in accordance with the policy, grants the attach request or the handover, designates for each virtual network function of the set of virtual network functions that is needed for providing the service, a corresponding virtual network function for serving the user endpoint device at a location of the user endpoint device, and provides the service to the user endpoint device via the set of virtual network functions.

18 Claims, 5 Drawing Sheets

500

MODULE 505
I/O DEVICES, E.G., STORAGE DEVICE 506
PROCESSOR 502
MEMORY 504

(51) Int. Cl.

| | |
|---|---|
| *H04W 8/06* | (2009.01) |
| *H04W 36/14* | (2009.01) |
| *H04W 8/08* | (2009.01) |

(56) References Cited

U.S. PATENT DOCUMENTS

| | | | | |
|---|---|---|---|---|
| 7,835,743 | B2 | 11/2010 | Zhang et al. | |
| 8,009,644 | B2 | 8/2011 | Kuo et al. | |
| 8,108,455 | B2 | 1/2012 | Yeager et al. | |
| 8,923,853 | B1 * | 12/2014 | Shaw | H04W 8/12 455/432.1 |
| 8,948,750 | B1 * | 2/2015 | Carames | H04W 8/12 455/418 |
| 9,167,493 | B2 | 10/2015 | Anschutz | |
| 9,173,201 | B2 | 10/2015 | Bosch et al. | |
| 9,980,123 | B2 * | 5/2018 | Mecklin | H04W 8/24 |
| 2014/0086177 | A1 | 3/2014 | Adjakple et al. | |
| 2015/0063166 | A1 | 3/2015 | Sif et al. | |
| 2015/0215738 | A1 | 7/2015 | Frusina et al. | |
| 2017/0150399 | A1 * | 5/2017 | Kedalagudde | H04W 28/08 |

FOREIGN PATENT DOCUMENTS

| | | | |
|---|---|---|---|
| EP | 2145362 | A2 | 1/2010 |
| EP | 2248017 | A1 | 11/2010 |

OTHER PUBLICATIONS

Qi, Han, and Abdullah Gani. "Research on mobile cloud computing: Review, trend and perspectives." Digital Information and Communication Technology and it's Applications (DICTAP), 2012 Second International Conference on. ieee, 2012. http://arxiv.org/pdf/1206.1118(Figure 1 on p. 1 and "virtualization" as a feature of mobile cloud computing on p. 3 with Figure 2).

Huerta-Canepa, Gonzalo, and Dongman Lee. "A virtual cloud computing provider for mobile devices." Proceedings of the 1st ACM Workshop on Mobile Cloud Computing & Services: Social Networks and Beyond. ACM, 2010. http://www.cs.vu.nl/~kielmann/cgc2012/slides/ogleja.pdf(Charts 9 to 17).

Liu, Fangming, et al. "Gearing resource-poor mobile devices with powerful clouds: architectures, challenges, and applications." Wireless Communications, IEEE 20.3 (2013): 14-22. http://www-users.cselabs.umn.edu/classes/Spring-2015/csci8980/papers/Intro/mobile_cloud_overview.pdf (Figure 3, p. 6).

Pentikousis, Kostas, Yan Wang, and Weihua Hu. "Mobileflow: Toward software-defined mobile networks." Communications Magazine, IEEE 51.7 (2013): 44-53. http://teampal.ustcsz.edu.cn/attachments/700/MobileFlow-Toward_Software-Defined_MN.pdf (pp. 45-50 and Figure 6 on p. 51).

* cited by examiner

METHOD AND APPARATUS FOR PROVIDING A VIRTUAL NETWORK FUNCTION IN A NETWORK

The present disclosure relates to a method and apparatus for providing virtual network functions in a network, e.g., a wireless communications network of a network service provider.

BACKGROUND

Supporting roaming subscribers (e.g., roaming user endpoint devices) in the wireless telecommunications industry between various wireless network service providers are well established. Mobility management can be used to locate the roaming mobile device in the visited network and to provide a method of authenticating and billing the roaming mobile device for connecting and using services provided by the visited network. However, many challenges remain as the quality of service experienced by a roaming subscriber may not be ideal or as expected.

SUMMARY

In one embodiment, the present disclosure provides a method, non-transitory computer-readable medium and apparatus for providing a virtual network function. For example, the method receives, via a processor of a visited network, an attach request or a handover for a user endpoint device, wherein the visited network is operated by a first wireless service provider, determines, via the processor, a home network for the user endpoint device, wherein the home network is operated by a second wireless service provider, receives, via the processor, a profile of the user endpoint device, determines, via the processor, a policy for providing a service to the user endpoint device in accordance with the profile of the user endpoint device, determines, via the processor, a set of virtual network functions needed for providing the service to the user endpoint device in accordance with the policy for providing the service, grants, via the processor, the attach request or the handover, designates, via the processor, for each virtual network function of the set of virtual network functions that is needed for providing the service, a corresponding virtual network function for serving the user endpoint device at a location of the user endpoint device, and provides, via the processor, the service to the user endpoint device via the set of virtual network functions that is designated.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
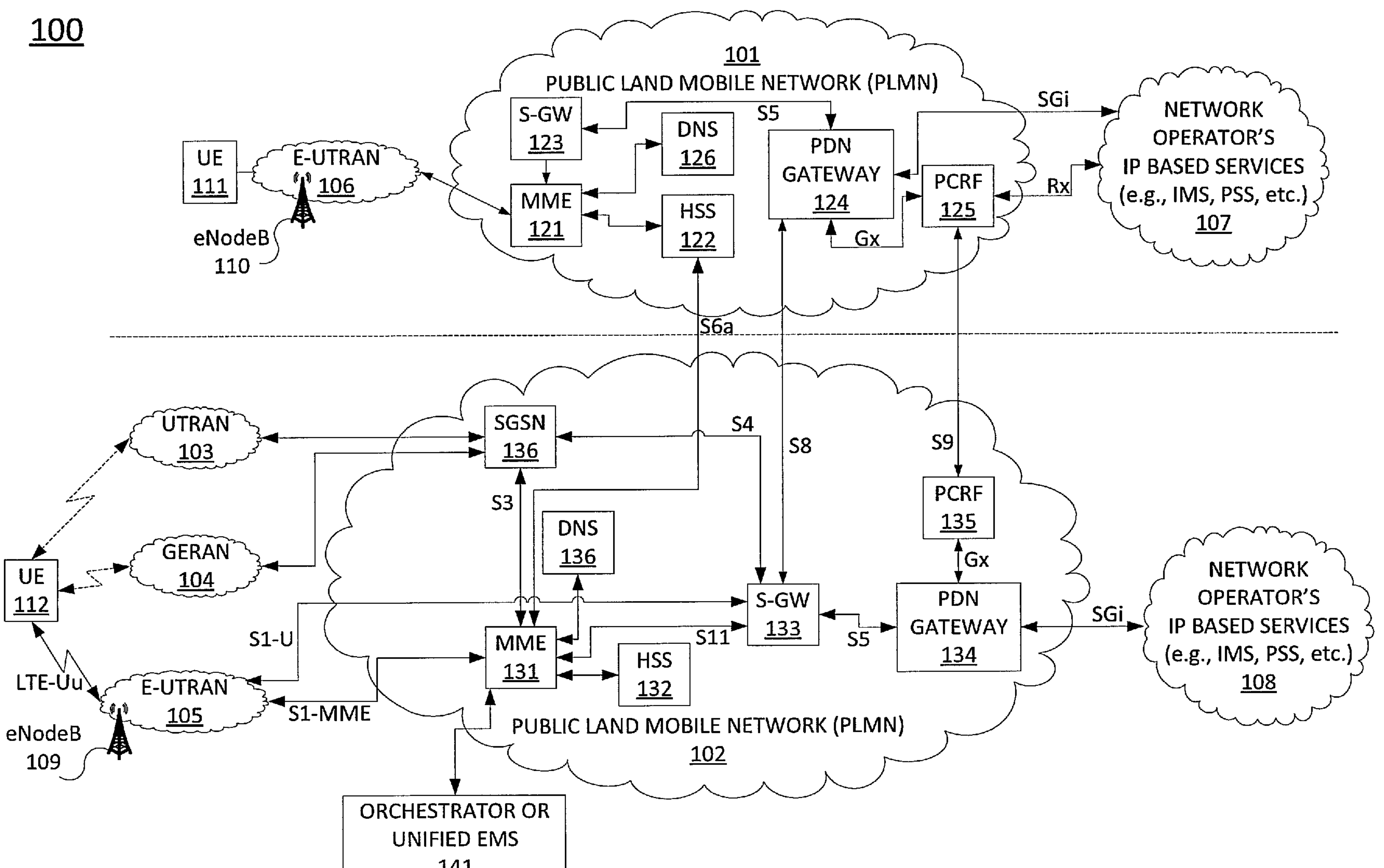
FIG. 1 illustrates an example network related to the present disclosure.

The present disclosure relates to a method and apparatus for providing a virtual network function in a network of a communications network service provider (broadly a network service provider). The teachings of the present disclosure can be applied for any type of wireless networks, e.g., 2G, 3G, Long Term Evolution (LTE), etc.

As popularity of wireless mobility grows, users are getting more and more reliant on their wireless service provider to provide a variety of services, e.g., telephony services, data services, multimedia delivery services, etc. For example, the users may travel outside a serving area of their wireless service provider, e.g., to another country, and may wish to continue accessing services to which they have subscribed. Thus, network operators may enter into partnership agreements to allow users to gain access to services while roaming. However, the partnership agreements are often limited. The "visited network" (e.g., a network not operated by the user's network service provider) may accept, modify or reject a Quality of Service (QoS) that is authorized by a "home network" (e.g., a network operated by the user's network service provider) of the user. For an illustrative example, suppose a user is a subscriber of a premium data service with a high QoS from a wireless service provider A. Suppose the user is roaming in an area covered by a wireless service provider B. Then, for the user, the home network is the network of service provider A and the visited network is the network of the service provider B. The visited network may reject the high QoS and provide the user with a data service having a lower QoS than the high QoS from the wireless service provider A.

In another example, the user may continue to receive most services via his/home network while gaining Internet access via a local breakout provided by the visited network. For instance, suppose the user may decide to make a voice call while roaming outside of the user's home network. The control and user plane data may transition out of the visited network to the home network. For example, the operators of the home and visited networks may use Internetwork Packet Exchange (IPX) services to transition the control and user plane data between them. Unfortunately, the exchange of control and user plane data may cause significant latency and jitter. The latency and jitter may impact performances of various applications. For example, services that are interactive are susceptible to latency and jitter. Some examples of applications that are not resilient to latency and jitter problems are voice applications, multimedia applications, gaming applications, and the like. The user may eventually become dissatisfied with the QoS provided while accessing such applications during a roaming scenario. The wireless service provider may then experience churn due to dissatisfaction with the subscribed services.

In one embodiment, the present disclosure provides a method, a computer readable medium and an apparatus for providing virtual network functions in a visited network that are based on agreements between the operators of the home network and the visited network. The virtual network functions of the present disclosure may be dynamically instantiated in virtual or physical network components of the visited network. As such, the roaming user may then access the applications described above via the instantiated virtual network functions in a visited network. In one embodiment, the instantiated virtual network functions are provided in the visited network solely for supporting the roaming subscribers of the home network.

In other words, in a virtualized network functions architecture, a virtualized network function (VNF), is responsible for handling specific network functions that operate in one or more virtual machines on top of the hardware networking infrastructure, which can include hardware components such as routers, switches, application servers, cloud computing systems, and the like. A series of VNFs can be chained together to provide a more complex service or a group of such services. One aspect of a VNF is the ability to scale up and down dynamically as necessary through dynamic instantiation as discussed further below.

In one embodiment, the virtual network functions are instantiated in a virtual component of the visited network. Then, the virtual component of the visited network may itself be instantiated in a physical network component. That is, the virtual network functions are provided, directly or indirectly, over some physical network element of the visited network, e.g., over an element that is tangible (i.e., perceptible to a sense of touch).

FIG. 1 illustrates an example network 100 related to the present disclosure. The network 100 comprises Public Land Mobile Networks (PLMNs) 101-102, radio access networks 103-106, user equipment or user endpoint (UE) devices 111-112, network operator's Internet Protocol (IP) based services 107-108, and an orchestrator or unified Element Management System (EMS) 141. In one example, a Public Land Mobile Network (PLMN) refers to a network operated by a single operator or network service provider.

The radio access networks 103 and 104 may comprise a Universal Terrestrial Radio Access Network (UTRAN) and a Global System for Mobile Communication (GSM) Edge Radio Access Network (GERAN), respectively. The radio access networks 105 and 106 may comprise evolved Universal Terrestrial Radio Access Networks (eUTRANs). In one illustrative example, the eUTRAN, e.g., eUTRAN 105 or 106, may comprise one or more eNodeBs.

UE 111 or 112 can be a mobile endpoint device, e.g., a smart phone, a cellular phone, a laptop, a computing tablet, or any endpoint communication devices equipped with wireless capabilities, e.g., a desktop computer, a set top box, a television, a digital media player, and the like. In operation, UE 111 or 112 may access wireless services via a radio access network. For simplicity, the present disclosure describes UEs 111 and 112 accessing services via an eNodeB, e.g., eNodeB 109 in the eUTRAN 105 or eNodeB 110 in the eUTRAN 106. The eNodeBs in the eUTRAN 105 are connected to a PLMN 102. The eNodeBs in the eUTRANs 106 are connected to a PLMN 101. The eNodeBs provide wireless interfaces to one or more UE devices. It should be noted that any number of eNodeBs can be deployed. If a UE is moved to an area covered by another type of access network, e.g., to an area near a cell site of UTRAN 103 or GERAN 104, the UEs may access services via a Serving GPRS (General Packet Radio Service) Support Node (SGSN) 136.

The PLMNs 101 and 102 comprise network functions for providing network services to users. For example, PLMN 101 may comprise a Mobility Management Entity (MME) 121, a Home Subscriber Server (HSS) 122, a Serving-Gateway (S-GW) 123, a Packet Data Network-Gateway (P-GW) 124, a Policy and Charging Rule Function (PCRF) 125, a Domain Name Server (DNS) 126. Similarly, PLMN 102 may comprise a MME 131, a HSS 132, a S-GW 133, a P-GW 134, a PCRF 135, and a DNS 136.

MMEs 121 and 131 are the control nodes for the eUTRANs 106 and 105, respectively. The eUTRANs 105 and 106 are LTE based radio access networks. The MME is responsible for UE (User Equipment) tracking and paging (e.g., such as retransmissions), bearer activation and deactivation process, selection of the S-GW, and authentication of a user.

The MME, e.g., MME 121 or 131, manages mobility for a pool of access network components (e.g., eNodeBs) serving a geographical area and is aware of UEs and their respective locations that are roaming in the geographical area. For instance, the MME may be controlling the cell site serving the UE. Thus, the MME is aware of the roaming user through any standard mobility procedure, e.g., attach, handover, update, and the like. The standard mobility procedure may be for an initial attach, request for a Globally Unique Temporary Identifier (GUTI) assignment, Packet Data Network (PDN) setup, Tracking Area Update (TAU), inter MME pool X2 or S1 interface based handover (HO), and the like. The user endpoint device is assigned the GUTI during an initial attach procedure.

HSSs 122 and 132 contain subscription-related information (e.g., subscriber profiles), perform authentication and authorization of a wireless service user, and provide information about the subscriber's location. S-GWs 123 and 133 are responsible for routing and forwarding user data packets, while also acting as the mobility anchor for the user plane during inter-eNodeB handovers and as the anchor for mobility between LTE and other wireless technologies, such as 2G and 3G wireless networks. Each of the P-GWs 124 and 134 serves as a gateway for providing access between the network in which it is located and various data networks, e.g., other IP network 107 or 108. PCRF 125 and 135 support access to subscriber databases and specialized functions of a charging system. DNSs 126 and 136 are responsible for address resolution of domain and host names into IP addresses, as well as locating resources on the internet for networks 101 and 102, respectively.

The orchestrator or unified EMS 141 is tasked with managing an infrastructure of a network. The orchestrator or unified EMS may provision services on both physical and cloud based network components. In one embodiment, the cloud based network comprises standard cloud based infrastructure elements. For example, the cloud based infrastructure elements may comprise one or more of: an X86 computer server, a top of the rack switch, an external storage, a controller, and an orchestrator or a unified Element Management System (EMS). In addition, the orchestrator or unified EMS 141 ties the various physical and network infrastructure components to one or more Operations Support System (OSS) platforms. The cloud based infrastructure may also include a database (e.g., deployed in a server) containing one or more templates. In one embodiment, the one or more templates are for instantiating one or more virtual network functions, e.g., a vMME, a vSGW, a vPGW, a vDNS, and a vPCRF.

FIG. 1 also indicates various data bearer paths or signaling bearer paths. The various data bearer paths may be referred to by specific labels. For example, the data bearer path may be S1-U, S5 or S8. In another example, the signaling bearer path may be an S1-MME bearer path. Note that the data bearer paths and their respective interfaces are defined by the 3GPP standard. It should be noted that the present disclosure is not limited to these specific interfaces.

As such, the data bearer paths and interfaces shown in FIG. 1 are not intended to limit the present disclosure.

To better understand the current invention, the following terminology will first be provided:

A Home PLMN;

A Visited PLMN; and

A Virtual Network Operator (MVNO) or a Mobile Other Licensed Operator (MOLO).

A home PLMN (HPLMN) refers to a PLMN of an operator from whom the user subscribes to services. For example, if a user who lives in New York City subscribes to services from a network operator X who provides services via its own network elements or devices in New York City, the user is said to be using an HPLMN when attached to an access point (e.g., cell, Wi-Fi access point) operated by operator X.

A visited PLMN (VPLMN) refers to a PLMN, wherein a user is roaming, e.g., outside an area served by the HPLMN, and is using resources in a network of an operator Y, wherein the user does not subscribe to services from the operator Y. For example, if the user subscribes to services from operator X and is roaming an area covered by operator Y, then the user is said to be using a VPLMN when attached to an access point of operator Y.

A Mobile Virtual Network Operator (MVNO) or a Mobile Other Licensed Operator (MOLO) refers to a wireless communications service provider that does not own wireless network infrastructure over which services are to be provided to subscribers.

Returning to the illustrative example above, suppose UE 111 belongs to a user who subscribes for wireless service from wireless service provider A, wherein the home network for UE 111 is PLMN 101 and another service provider B is the operator of PLMN 102. If UE 111 is roaming and attaches to eNodeB 109, then PLMN 102 would then be a visited network for UE 111. Then, for UE 111, PLMN 102 may be referred to as VPLMN, and PLMN 101 may be referred to as the HPLMN.

In operation, when the user is roaming, the UE device of the user attaches to an access point (e.g., a cell) of a VPLMN and uses resources of the visited network. The resources that are accessed while roaming may be any type of network function needed for receiving one or more services to which the user subscribes. For example, the user may be a subscriber to services that comprise one or more of: a voice service, a data service, a multimedia messaging service, a video service, a gaming service, etc. The user may be entitled to receive all or some services while roaming. For example, the user may be able to access all services except gaming. Then, the resources used in the visited network may comprise serving gateways, packet data network gateways, domain name servers, etc.

A wireless service provider may have several data centers, e.g., throughout a region, a nation, etc. In addition, there may be any number of MVNOs, MOLOs and other wireless service providers with no coverage in the region, the nation, etc. However, the MVNOs, MOLOs and other wireless service providers may have subscribers who roam throughout the region, the nation, etc. Each MVNO, MOLO and other wireless service providers may then wish to have access to instances of virtual network functions in a visited network of a wireless service provider which has physical infrastructures in the region, the nation, etc. In one embodiment, a "visited" wireless service provider may enter into an agreement with any number of other wireless service providers for providing the virtual network functions. For the example described above, the "home" wireless service provider A may enter into an agreement with a "visited" wireless service provider B that has an access network in the geographical area to enable subscribers of wireless service provider A to roam in the geographical area covered by the wireless service provider B. For example, the roaming is to be provided via virtual network functions of the wireless service provider A that are instantiated in the visited network of the wireless service provider B.

Then, for each MVNO, MOLO, or other wireless service providers with whom the visited wireless service provider (e.g., broadly a first wireless service provider) has entered into an agreement, the visited wireless service provider may allow the instantiation of one or more virtual network functions in accordance with a respective agreement. The collection of virtual network functions instantiated for a particular wireless service provider (e.g., a particular "home" (broadly a second) wireless service provider) may be referred to as a cloud network of the particular wireless service provider. Each cloud network comprises any number of virtual network functions. For example, the virtual network functions in a cloud network may comprise one or more of: a virtual MME (vMME), a virtual S-GW (vSGW), a virtual P-GW (vPGW), a virtual DNS (vDNS), a virtual PCRF (vPCRF), and the like.

The wireless service provider continues to monitor network conditions and conditions of all virtual network functions that are instantiated. For instance, if an existing vMME, vSGW, or vPGW, is close to being exhausted in terms of its ability to serve more visiting UEs in an area, a new VNF may be instantiated. Then, a UE roaming in the visited network may be provided with a service via either a newly instantiated or an existing VNF. For an illustrative example, a new vSGW and an existing vPGW may be used to provide the service to the roaming UE. In other words, the existing serving gateway may not have adequate capacity to serve the roaming UE while the existing virtual packet data network gateway has capacity to serve the roaming UE. The need for instantiating a new virtual network function is determined individually for each type of network function needed to provide services to the roaming UE.

In one embodiment, the agreement may include that the "visited" wireless service provider provides the virtual network functions in accordance with a policy for providing a virtual network function received from a home network of the UE device. In one embodiment, the policy for providing the one or more virtual network functions comprises one or more of: a parameter for triggering an instantiation of a new virtual network function, a parameter for triggering a modification of an existing virtual network function, a threshold for triggering an instantiation of a new virtual network function, a threshold for triggering a modification of an existing virtual network function, a parameter to be provided to a network element that performs an orchestration of virtual network functions, and a threshold to be provided to a network element that performs an orchestration of virtual network functions. The network element that performs the orchestration of virtual network function may be an orchestrator or a unified EMS.

For an illustrative example, the policy received from an MVNO may be to instantiate a new virtual S-GW if more than 10 subscribers of the MVNO are attached to the visited network at a location of an access point. Then, the parameter may be a number of roamers of the MVNO associated with a same access point. The threshold for the parameter of the number of roamers may be set to 10. For example, if 11 subscribers of the MVNO send an attach request via the same access point, e.g., a particular cell site or Wireless- Fidelity (Wi-Fi) Access Point (Wi-Fi AP), the "visited" wireless service provider may instantiate a new virtual S-GW for the MVNO. The MME may also dynamically send the number of roamers who are currently being serviced to the orchestrator as an update, e.g., on a per virtual network function basis.

In one example, the orchestrator may have access to the various agreed upon policies as to how and when a virtual network function will be instantiated or modified. In other words, the various parameters and associated thresholds are made available to the orchestrator, thereby allowing the orchestrator to coordinate the instantiation or modification of one or more virtual network functions in the visited network.

For example, the same type of virtual network function may also have different capabilities and requirements, e.g., a "small" virtual S-GW versus a "large" virtual S-GW. Such relative terms of "large" and "small" are only intended to illustrate that there may be granularity as to the capabilities and requirements for each type of virtual network function. For example, a "small" virtual S-GW is intended to service no more than 10 roamers, whereas a "large" virtual S-GW is intended to service up to 100 roamers. The use of the threshold values of 10 and 100 are only illustrative. In one embodiment, the purpose of having such granularity may relate to the cost and availability of the underlying network resources that the visited network will need to provide in supporting the numerous virtual network functions. A "small" virtual network function may cost less for the home wireless service provider in providing a level of service to its roaming subscribers while on a visited network without consuming a large amount of processing resources of the visited network. In contrast, a "large" virtual network function may cost more for the home wireless service provider because it may consume a larger amount of processing resources of the visited network. Thus, by providing the orchestrator with up-to-date information as to the parameters and various thresholds, e.g., as to the number of roaming UEs that are currently being serviced in the visited network on a per virtual network function basis, it will allow a more efficient management of cost and network resources for both the home wireless service provider and the visited wireless service provider.

In one embodiment, the agreement may also specify that the visited wireless service provider will provide a service to a roaming UE with the same level of service that the roaming UE would have received from a home network of the roaming UE. For example, the policy may include an indication as to how traffic to and from the roaming UE is to be treated, e.g., the level of service to be applied to the traffic of the roaming UE such as transmission rate level, delay level, error rate level and/or any other measurable network based characteristics that can be guaranteed in advance. In one embodiment, the indication is based on one of more of: a type of user (e.g., a user who subscribed to a premium service, a standard service, a basic service, etc.), a type of service (e.g., data service, voice service, multimedia delivery service, etc.), a QoS requirement, and the like.

In one embodiment, the policy for providing the instantiation of a virtual network function in a visited network and/or the policy for the service to be provided in the visited network may be stored in a central repository. For example, the operator of the visited network may have an agreement with any number of other network operators. For each agreement with another network operator, a respective policy may be formulated and stored in the central repository.

In one embodiment, the policy for providing the virtual network function and/or the policy for the service may be at an International Mobile Subscriber Identity (IMSI) series level, at a PLMN level, at an access point name (APN) level. In one embodiment, the policy for providing the virtual network function may comprise a plurality of policies, where each policy of the plurality of policies is established for a range of a number of concurrently attached subscribers. For example, a first policy may apply for up to 10 concurrently attached roaming subscribers to a same VNF (or VNFs), a second policy may apply for the next 11-50 concurrently attached roaming subscribers, a third policy may apply for the next 51-500 concurrently attached roaming subscribers, and so on.

In one embodiment, the policy for providing the virtual network function and/or the policy for the service may be based on one or more attributes of the service accessed by a roaming user while roaming. For example, the attributes of a Voice over LTE (VoLTE) service, a messaging service, a data service, a multimedia service, etc. received while roaming may be used to determine applicable policies. In one embodiment, the policy for providing the virtual network function and/or the policy for the service may be based on one or more attributes of a combination of services accessed by the roaming user. For example, a policy may apply for roaming users who access only voice services while roaming, and another policy may apply for roaming users who access both multimedia and voice services while roaming.

In one embodiment, the policy for providing the virtual network function and/or the policy for the service received from another wireless service provider are configurable in a network element tasked with managing mobility in a visited network. For example, policies received from an MVNO may be provided to an MME of the visited network via usage of Access Point Name (APN), e.g., using a Mobile Subscriber Identity Name Server Access Point Name-Operator Identifier (IMSI NS APN-OI) replacement. The APN-OI replacement indicates a domain name to replace the APN-OI with when constructing a P-GW Fully Qualified Domain Name (P-GW FQDN) upon which to perform a Domain Name Server (DNS) resolution. The replacement applies for all access point names in a profile of a user.

For example, the visited wireless service provider may receive an update to an existing policy for providing the virtual network function or an existing policy for the service from another network, e.g., from a home network of a roaming UE. For example, an operator of an MVNO may change a policy on how a class of its subscribers should be treated when this class of subscribers roam in the visited network.

In one embodiment, for each operator (e.g., an MVNO operator), the MME of the visited network sets up one or more triggers for providing one or more VNFs based on a policy that is defined and received from the operator. For example, the policy may include a trigger for instantiating a new VNF, a trigger for modifying a size of an existing VNF, and so on.

In one embodiment, the MME of the visited network monitors the VNFs and the registered UE devices. The monitoring may be used to gather information regarding movements of UEs (e.g., handovers, attachments, detachments, service requests, bearer establishments, and the like), policy updates from operators (e.g., from MVNOs), changes to profiles of user (e.g., update received from HSSs of other operators), updates to Policy and Charging Rule Function (PCRF), etc. The MME then determines whether there is a need for: adding a new instance of a VNF, modifying an existing VNF (e.g., to a smaller or a larger size), deleting an existing VNF, or modifying the treatment of traffic to and from a roaming UE. The monitoring and making adjustments in the network are performed dynamically as roaming UEs enter the coverage area of the visited network operator, access services while roaming, and then detach when existing the coverage area of the operator.

When a UE sends an attach request to an MME via a cell or access point of a VPLMN, the MME of the VPLMN receives the attach request. The MME of the VPLMN then identifies the HPLMN of the UE and receives a profile of the UE. In one embodiment, the profile is received by sending a query to the HPLMN of the UE. For example, the query may be sent to an HSS of the HPLMN. In one embodiment, the sending of the profile may be part of the agreement between the VPLMN and the HPLMN.

When the profile is obtained by sending a query to the HPLMN, the MME of the visited network determines whether the profile is received. In one embodiment, the received profile for the UE will indicate a list of one or more services that the UE may access while roaming. In one embodiment, if the profile is not received, the MME may select a default profile for the UE. For example, the agreement between the wireless service providers may include a default profile to be used when a profile is not obtained for a roaming UE. In another embodiment, if the profile is not received, the MME may opt to deny the attach request.

The MME then proceeds to determine a corresponding policy to apply in providing one or more services to the UE. In one embodiment, the MME may determine the policy by dynamically communicating with a server of the home network, e.g., a Home Subscriber Server (HSS) of a home network of the UE. For example, the profile indicating which services the UE may receive while roaming and/or conditions for each service (e.g., applicable QoS, limits (e.g., data rate, minutes of use, time of day restrictions), and the like) may have been received from a server of the home network of the UE. Then, the MME may determine the policy in accordance with the profile and/or conditions for each service that are received from the server of the home network of the roaming UE.

In another example, a default profile may have been selected for the UE. The MME may then determine the appropriate policy established for UEs having a default profile. For instance, the operators of the visited network and the home network of the UE may have agreed to provide a particular quality of service and a selected subset of services to roaming UEs attached to the cell of the visited network with a default profile.

In one embodiment, the MME may determine the policy for providing one or more services to the roaming UE from a profile of an access point name. For example, an APN may have a profile that is associated with the APN, wherein the profile associated with the APN indicates that Internet Protocol Multimedia Subsystem (IMS) APN with VPLMN is allowed for the UE.

The MME then determines one or more VNFs that are needed for providing a service to the UE in accordance with the profile. For example, the MME may determine that a vSGW and a vPGW are needed for providing the service to the UE. For each VNF, the MME determines if an existing VNF may serve the UE. For instance, the MME may determine whether an existing vSGW has the capacity to serve the roaming UE at the current location of the roaming UE. Similarly, the MME determines if an existing vPGW can serve the UE. Thus, the MME makes a determination as to which network functionalities can be provided via an already instantiated VNF. If a threshold is reached for a number of UEs being served by an existing VNF, then the MME may need to instantiate a new VNF or modify a size of an existing VNF. If the existing virtual network function is available to serve the UE, a threshold or trigger for instantiating a new VNF will not be reached.

For the example above, suppose the UE is associated with a user who subscribed to a wireless service from a network operator A. In addition, suppose the user is traveling with the UE and is now located in New York City and that the network operator A does not have an access network in New York City. The user then has to roam in order to gain access to wireless services. When the user turns on the UE, the UE communicates with an MME that manages mobility for cells and/or access points in New York City for attaching to a network of an operator, e.g., an access point of network operator B. Then, the MME operated by network operator B determines if a threshold is reached for triggering instantiation of VNFs (e.g., vSGW, vPGW, vDNS, etc.) for network operator A in New York City. For instance, there may be a VNF capacity in another region of the United States for network operator A. However, the user is now in New York City. Thus, the need to instantiate VNFs or change the sizes of existing VNFs is determined in view of the current physical location of the UE. That is, the determining of whether a threshold is reached for instantiation of a new VNF or modifying a size of an existing VNF is based on the geographical location of the user endpoint device, the policy for providing the service, and the policy for providing the virtual network function received from the home network of the roaming user endpoint device.

As the example above illustrates, in one scenario services may be provided to the UE without a need to instantiate new VNFs. The one or more existing VNFs may still have adequate capacity to serve the new roaming UE that is being attached. In another scenario, there may be a need to create a new instance of a VNF, e.g., a new vSGW and/or a new vPGW, for network operator A at the location. In another scenario, there may be a need to modify a size of an existing VNF. For instance, a previous instance of a vSGW may have been created to handle a maximum of n UEs and the current attach request or handover may be for UE number n+1. Then, a larger vSGW that can handle more roaming UEs may be needed and a size of a previously instantiated vSGW may be modified to a larger size.

In one embodiment, the location of the UE may be determined via another procedure. For example, the user may be located in a venue, e.g., a stadium, an arena, and the like, known by the wireless service provider. The UE of the user may communicate via an access point associated with the venue. The wireless service provider may then assume the location as being the venue.

When the threshold for triggering the instantiation of the VNF and/or modify the size of an existing VNF is reached at the location of the UE, the MME may send a request to a unified EMS or an orchestrator, wherein the request is for instantiating one or more VNFs or modifying one or more existing VNFs in accordance with the threshold. For example, a request for instantiating a new vSGW, a new vPGW, or the like, may be sent. In another example, a request for changing a size of an existing vSGW, vPGW, or the like, may be sent. For example, a larger VNF may suffice.

In one embodiment, the orchestrator or unified EMS determines a size and a template for a VNF that is to be instantiated. For example, the orchestrator or unified EMS may be provided with any number of templates for creating the VNF. The orchestrator or unified EMS may also be provided with policies for selecting an appropriate template.

In one embodiment, the templates are based on one or more of: policies received from the home network operator, and a network condition of the visited network. For example, the policy received from the home network operator may indicate creating a small VNF when less than ten subscribers of the home network operator attach to a same cell or access point. In another example, the size of the VNF may be based on concurrent attach requests. In another example, the size of the VNF may be based on a grade of service (e.g., a basic service versus a premium service).

The orchestrator or unified EMS then instantiates the one or more VNFs and/or modifies the size of the one or more existing VNFs. The orchestrator or unified EMS then informs the MME that the one or more VNFs are instantiated and/or the sizes of the one or more existing VNFs are modified.

The MME then designates a set of VNFs for serving the roaming UE. Each VNF in the set may be a VNF that is newly instantiated or an existing VNF. For example, if the VNFs needed to serve the UE include a SGW and a PGW, then a newly instantiated vSGW and a newly instantiated vPGW may be designated, a newly instantiated vSGW and a modified vPGW may be designated, a modified vSGW and a newly instantiated vPGW may be designated, or a modified vSGW and a modified vPGW may be designated. In other words, any combinations of newly instantiated or modified VNFs can be designated for serving the roaming UE.

The MME then initiates updates to DNS servers, Naming Authority Pointer (NAPTR) records, etc. For example, an Access Point Name Domain Name Server (APN DNS) NAPTR record may be updated to point the APN to the newly instantiated or modified VNF. For instance, based on the APN and tracking area code, the newly instantiated or modified VNFs may be designated to serve the UE. Then, the designated VNFs are selected using a DNS NAPTR longest label matching procedure. Traffic (e.g., VoLTE or data) may be directed to and from the roaming UE via the newly designated VNF (or VNFs).

Subsequently, the UE may move from a coverage area of the VNFs that are within a purview of an MME through which the UE was initially granted access, to another coverage area of VNFs that are within the purview of another MME. The handover may be performed in a coordinated manner to allow the UE to continue accessing services at the new location. When a UE is no longer being served by the VNFs, an entry to the NAPTR record may be deleted. Thus, as UEs move out of an area, the MME invokes a procedure to update records (i.e., to clean relevant records).

Figure 2:
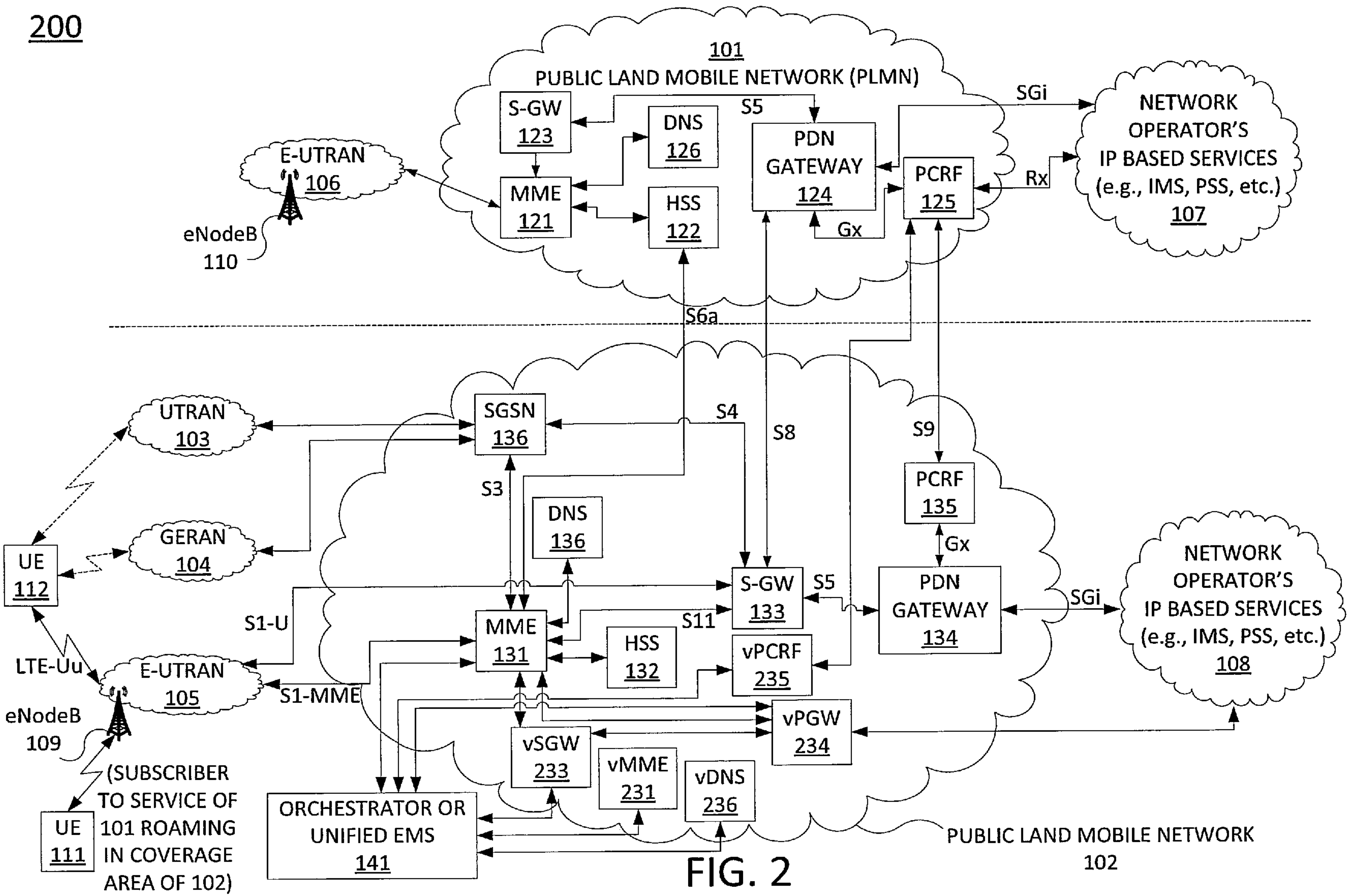
FIG. 2 illustrates an example network with virtual network functions related to the present disclosure.

FIG. 2 illustrates an example network 200 with illustrative virtual network functions related to the present disclosure. The network 200 is similar to the network illustrated in FIG. 1. However, the operator of network 102 has an agreement with the operator of network 101 to provide VNFs for roamers who subscribe to services from the operator of network 101. For example, network 102 of the VPLMN comprises a vMME 231, a vSGW 233, a vPGW 234, a vDNS 236, and a vPCRF 235 that are instantiated for the operator of PLMN 101. If the user of UE 111 travels to an area covered by eNodeB 109, the MME 131 receives an attach request from UE 111. MME 131 may then determine that UE 111 is associated with PLMN 101. MME 131 may communicate with HSS 122 to receive a profile for UE 111.

Once the services that may be accessed by UE 111 are determined, MME 131 determines if the VNFs that are already instantiated for the operator of PLMN 101 at the current location of UE 111 may serve UE 111. If the existing VNFs can provide the service, UE 111 is granted the attachment and the existing VNFs are designated by MME 131 to serve the UE. However, if one or more existing VNFs cannot serve the UE (e.g., vSGW 233 has reached its limit), a new vSGW may be instantiated via the orchestrator 141. The new vSGW may then be designated to serve UE 111. The MME 131 continues to monitor all the VNFs that are instantiated for the operator of network 101 and all registered UEs. If a movement of UEs, handovers, etc., makes a modification necessary, the MME 131 will orchestrate the modification via the orchestrator 141.

The method of the present disclosure provides several advantages. As described above, the present disclosure provides a method for emulating a home network environment of a UE in a visited network by dynamically instantiating virtual network functions in the visited network while accounting for network conditions and the profile of the UE. In other words, the present disclosure provides a software defined network that spans networks of multiple operators. The visited network learns about the UE either during an attach procedure or a handover procedure. The visited network dynamically monitors its network resources (including all the instantiated virtual network functions) and all registered roaming UE devices. Based on network conditions, e.g., a number of UEs attached to an access point (e.g., a cell), movement of UEs within the visited network, types of services being accessed, etc., the controller of the visited network (e.g., the MME) may dynamically make adjustments to instantiate one or more new VNFs for the home network, modify one or more existing VNFs for the home network, combine two or more existing VNFs for the home network, delete one or more existing VNFs for the home network, etc., as needed. The instantiating, modifying, combining, and/or deleting are triggered by the controller (e.g., the MME) by sending a request to an orchestration engine, e.g., orchestrator 141. The orchestration engine is provided with templates for performing the instantiating, modifying, combining, and/or deleting. The orchestration engine then replies to the controller indicating whether the requested instantiating, modifying, combining, and/or deleting are performed. The controller, e.g., MME, may then designate the appropriate VNFs for providing services to the roaming UE. The DNS and NAPTR records are updated such that traffic directed to and from the roaming UE traverses the visited network through the newly designated vSGW and vPGW. Thus, the method of the present disclosure enables the roaming UE to receive a service as if the roaming UE is accessing services directly from the home network. For example, the QoS while roaming in the visited network may be similar to the QoS while using the home network.

Figure 3:
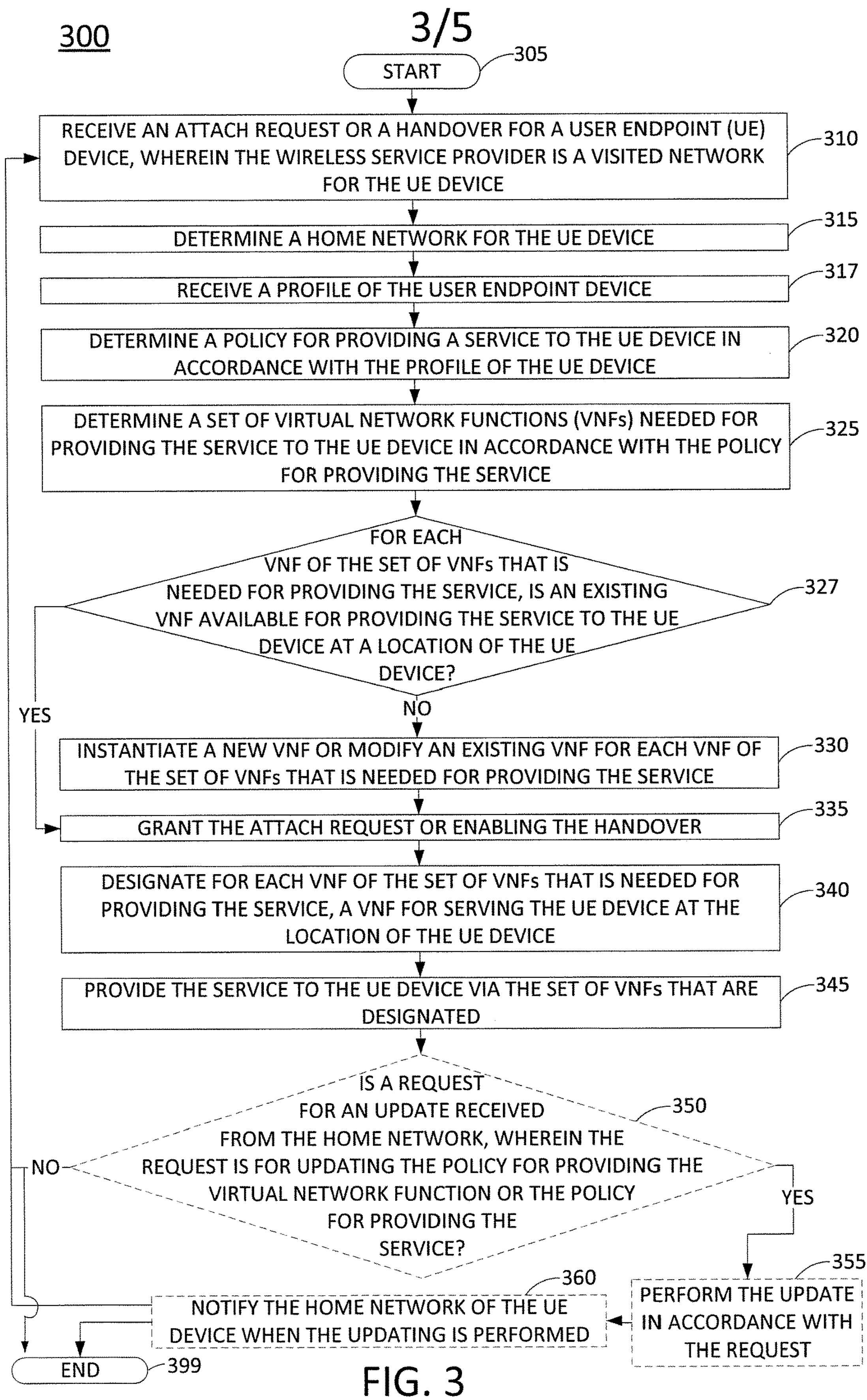
FIG. 3 illustrates a flowchart of an example method for providing virtual network functions in accordance with the present disclosure.

FIG. 3 illustrates a flowchart of an example method 300 for providing virtual network functions in accordance with the present disclosure. In one embodiment, the method 300 may be implemented in a controller of a visited network of a wireless service provider, e.g., an MME, or the processor 502 as described in FIG. 5. The method 300 starts in step 305 and proceeds to step 310.

In step 310, the processor, receives an attach request or a handover for a user endpoint device by a visited wireless service provider of a visited network that will be providing a service for the roaming user endpoint device.

In step 315, the processor, determines a home network for the roaming user endpoint device. For example, the visited wireless service provider may be providing virtual network functions for any number of other wireless service providers. Then, the processor needs to determine which one of the other wireless service providers is the home network for the current roaming user endpoint device.

In step 317, the processor, receives a profile associated with the roaming user endpoint device. In one example, the profile may be received from an HSS of the home network. In another example, a default profile may be received from a server, e.g., a database server used to store profiles.

In step 320, the processor, determines a policy to be applied for providing a service to the roaming user endpoint device in accordance with the profile of the roaming user endpoint device. In one example, the policy may be to allow the user to access all services while roaming and the manner in which the services will be accessed.

In step 325, the processor, determines a set of one or more virtual network functions needed for providing a service to the roaming user endpoint device in accordance with the policy for providing the service that is determined. For example, the set of VNFs may include a vSGW, a vPGW, a vDNS, etc.

In optional step 327, the processor, determines for each virtual network function of the set of virtual network functions that is needed for providing the service, whether an existing virtual network function is available for providing the service to the roaming user endpoint device at a location of the roaming user endpoint device. For an illustrative example, an existing vPGW may be able to serve the UE, a new vSGW may need to be instantiated to serve the UE, and an existing vDNS server may need to be expanded to a larger size to serve the UE, etc. If no existing VNF is determined as being available, the method 300 proceeds to step 330. Otherwise, the method 300 proceeds to step 335.

In optional step 330, the processor, instantiates a new virtual network function or modifies an existing virtual function for each virtual network function of the set of virtual network functions that is needed for providing the service, when a corresponding existing virtual network function is determined as being unavailable. For the example described above, the new vSGW may be instantiated and the existing vDNS server may be modified. It should be noted that optional steps 327 and 330 can be deemed as examples as to how step 325 is implemented in various embodiments. In other words, these optional steps illustrate how method 300 selects the set of VNFs to support the roaming UE.

In step 335, the processor, grants the attach request or enables the handover. For example, the processor may reply to the roaming user endpoint device granting an attachment to an access point, e.g., an eNodeB.

In step 340, the processor, designates for each virtual network function of the set of virtual network functions that is needed for providing the service, a virtual network function for serving the roaming user endpoint device at the location of the roaming user endpoint device. For example, the existing vPGW, the newly instantiated vSGW and the newly expanded vDNS may be designated as being the VNFs to serve the roaming UE at the current location of the roaming UE.

In step 345, the processor, provides the service to the roaming user endpoint device via the set of virtual network functions that is designated. For example, voice and data services may have been in the profile obtained for the roaming user. Thus, newly designated VNFs may be used to direct voice and data traffic to and from the roaming UE.

In optional step 350, the processor, determines if a request for an update is received from the home network, wherein the request is for updating the policy for providing the virtual network function or the policy for providing the service. If the request for the update is received, the method 300 proceeds to step 355. Otherwise, the method 300 either returns to step 310, or to step 399 to end the process.

In optional step 355, the processor, performs the update in accordance with the request. For example, the processor updates a database that contains the latest policies associated with the home network.

In optional step 360, the processor, notifies the home network when the updating is performed. Then, the processor either returns to step 310, or to step 399 to end the process.

Figure 4:
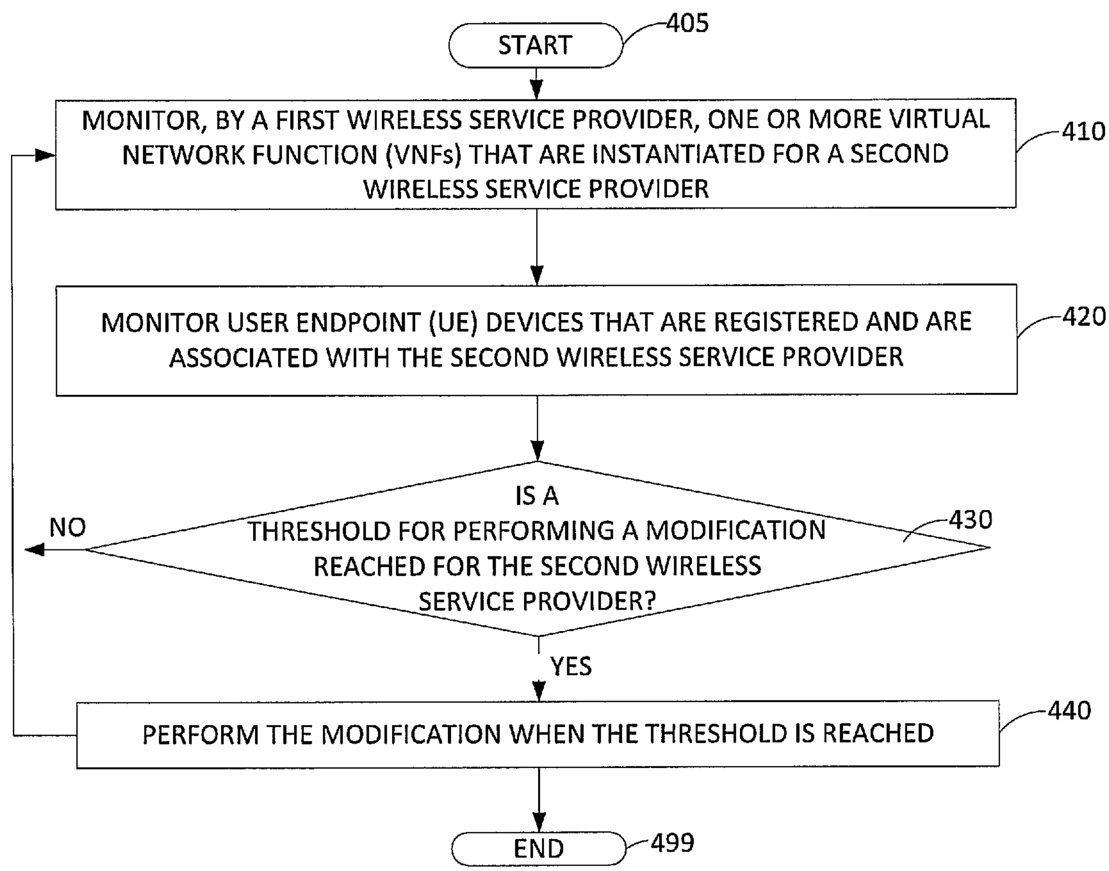
FIG. 4 illustrates a flowchart of an example method for providing virtual network functions and performing modifications in accordance with the present disclosure.

FIG. 4 illustrates a flowchart of an example method 400 for providing virtual network functions and performing modifications in accordance with the present disclosure. In one embodiment, the method 400 may be implemented in a controller of a visited network of a wireless service provider, e.g., an MME, or the processor 502 as described in FIG. 5. The method 400 starts in step 405 and proceeds to step 410.

In step 410, the processor of a first wireless service provider, monitors one or more virtual network functions for a second wireless service provider that are instantiated in a network operated by the first wireless service provider. In step 420, the processor, monitors roaming user endpoint devices that are associated with the second wireless service provider and that are registered to receive one or more services in the visited network of the first wireless service provider through the one or more virtual network functions.

In step 430, the processor, determines whether a threshold for performing a modification to one or more VNFs is reached for the second wireless service provider associated with the one or more virtual network functions. For example, the threshold associated with the one or more virtual network functions may be reached due to movements of registered user endpoint devices, new attach requests, handovers, updates to policies for providing services to roaming user endpoint devices being received from the second wireless service provider, updates to policies for instantiating new virtual network functions being received from the second wireless service provider, and the like. If the query is determined positively, the method proceeds to step 440, otherwise, the method returns to step 410.

In step 440, the processor, performs the modification when the threshold is reached. For example, the threshold may be for expanding a size of an existing VNF. The modification may then be made according to a predetermined policy or template. In another example, the modification may be to instantiate a new VNF at a location. The method 400 then either returns to step 410, or to step 499 to end the process.

Figure 5:
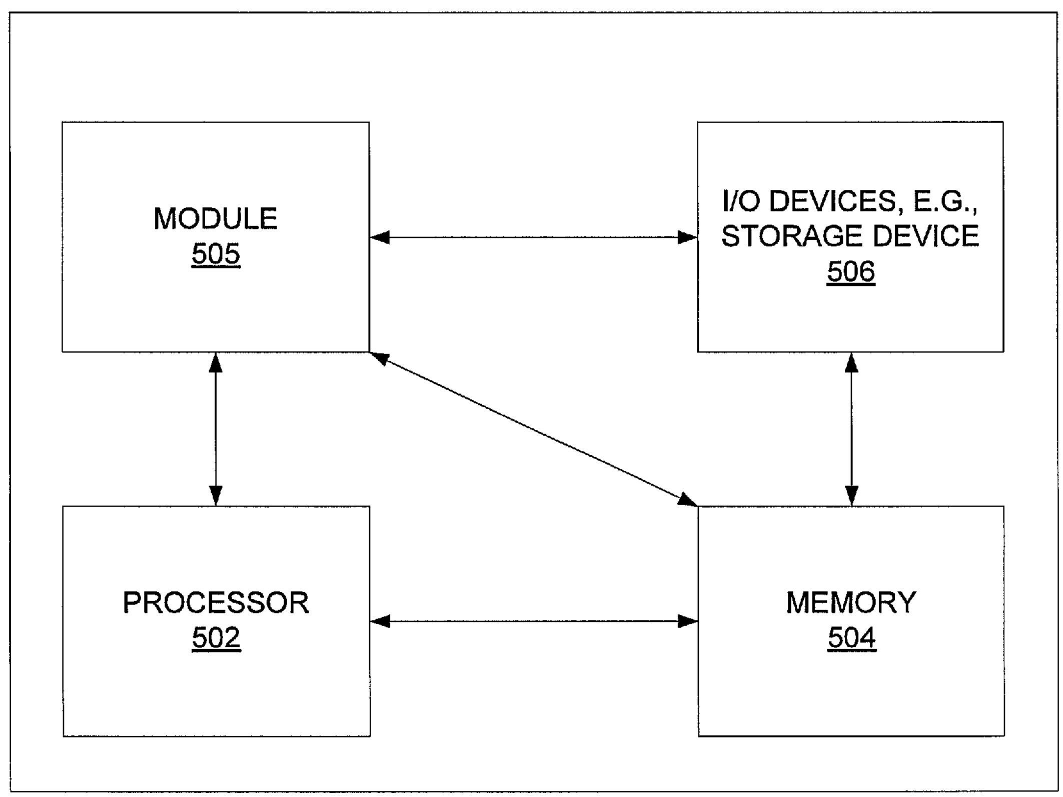
FIG. 5 depicts a high-level block diagram of a computer suitable for use in performing the functions described herein.

In one embodiment, a controller device, e.g., the MME, may be deployed as a hardware device embodied as a dedicated device (e.g., the dedicated computer 500 as illustrated in FIG. 5). In one embodiment, the controller, e.g., MME, is configured to perform the methods and functions described herein (e.g., the method 300 or method 400 as discussed below).

In one example, the controller device, e.g., an MME, of the present disclosure is configured for receiving an attach request or a handover for a user endpoint device, wherein the visited network is operated by a first wireless service provider, determining a home network for the user endpoint device, wherein the home network is operated by a second wireless service provider, receiving a profile of the user endpoint device, determining a policy for providing a service to the user endpoint device in accordance with the profile of the user endpoint device, determining a set of virtual network functions needed for providing the service to the user endpoint device in accordance with the policy for providing the service, granting the attach request or the handover, designating for each virtual network function of the set of virtual network functions that is needed for providing the service, a corresponding virtual network function for serving the user endpoint device at a location of the user endpoint device, and providing the service to the user endpoint device via the set of virtual network functions that is designated.

In another example, the controller device of a first wireless service provider, e.g., an MME of the first wireless service provider, of the present disclosure is configured for monitoring one or more virtual network functions that are instantiated for a second wireless service provider of a home network, monitoring user endpoint devices that are associated with the second wireless service provider and that are registered to receive a service through the one or more virtual network functions, determining a threshold for performing a modification is reached for the second wireless service provider associated with the one or more virtual network functions, and performing the modification.

In one embodiment, the network 102 may include a controller (broadly a controller device), and a database. For example, the controller may be deployed as a hardware device embodied as a dedicated database server (e.g., the dedicated computer 500 as illustrated in FIG. 5). In one embodiment, the controller, e.g., MME of the visited network, is configured to perform the methods and functions described herein (e.g., the method 300 or method 400 discussed below). For example, the visited network service provider may dynamically provide the necessary virtual network functions on behalf of a home network service provider, by monitoring its own network resources and the registered roaming user endpoint devices, thereby making the necessary modifications (e.g., instantiating or modifying one or more VNFs). In turn, the virtual network functions improve how a roaming user will access services while roaming in a location serviced by a visited network.

It should be noted that the networks 100 and 200 may include additional networks and/or elements that are not shown to simplify FIG. 1 and FIG. 2. For example, the access networks and the public land mobile networks of FIG. 1 and FIG. 2 may include additional network elements (not shown), such as for example, base stations, border elements, gateways, firewalls, routers, switches, call control elements, various application servers, and the like.

In addition various types of data may be stored in any number of databases. For instance, user profiles, policies of various wireless service providers, agreements with various service providers, parameters and thresholds for providing the virtual network functions, may be stored in various databases, e.g., a separate database. In addition, the various types of data may be stored in a cloud storage. In other words, the first network service provider may implement the service for providing virtual network functions of the present disclosure by utilizing distributed controllers, and storing data in a cloud storage and/or a centralized server.

In addition, although not specifically specified, one or more steps, functions or operations of method 300 or method 400 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 3 or FIG. 4 that recite a determining operation or involve a decision do not necessarily require that both branches of the determining operation be practiced. In other words, one of the branches of the determining operation can be deemed as an optional step. Moreover, steps, blocks, functions or operations of the above described method 300 or 400 can be combined, separated, and/or performed in a different order from that described above, without departing from the example embodiments of the present disclosure. It should be noted that the above described method can be deployed with various different implementations. For example, the receiving profiles or policies may be performed via a dedicated computer.

In one example, the present method for providing virtual network functions of the present disclosure is implemented via a dedicated database server. For example, in one embodiment, the method of the present disclosure is implemented via a dedicated controller, e.g., MME 131, for dynamically providing the virtual network functions. The dedicated controller, e.g., MME, is operated and managed by a network service provider. For example, the first network service provider may operate one or more communications networks to provide one or more services such as telephony services, cellular services, data services (e.g., data access and transfer services, Internet access services, and the like), multimedia delivery services (e.g., multimedia programming delivery services such as movies, videos, music and the like), and the like.

As such, the present disclosure provides at least one advancement in the technical field of providing virtual network functions for a roaming user endpoint device. This advancement improves the ability of the roaming user endpoint device to utilize services without incurring poor user experience such as delay and jitter associated with roaming services. For example, the roaming user endpoint device is able to access services as if the user was receiving the services directly from the home network, e.g., with a same QoS as the home network of the user endpoint device.

FIG. 5 depicts a high-level block diagram of a computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for providing virtual network functions, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 300 or method 400 as discussed above is implemented in a distributed or parallel manner for a particular illustrative example, i.e., the steps of the above method 300 or method 400, or each of the entire method 300 or method 400 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method 300 or method 400.

In one embodiment, instructions and data for the present module or process 505 for providing virtual network functions (e.g., a software program comprising computer-executable instructions) can be loaded into memory 504 and executed by hardware processor element 502 to implement the steps, functions or operations as discussed above in connection with the illustrative method 300 or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for providing virtual network functions (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:

receiving, via a processor of a visited network, an attach request or a handover for a user endpoint device, wherein the visited network is operated by a first wireless service provider;

determining, via the processor, a home network for the user endpoint device, wherein the home network is operated by a second wireless service provider;

receiving, via the processor, a profile of the user endpoint device;

determining, via the processor, a policy for providing a service to the user endpoint device in accordance with the profile of the user endpoint device;

determining, via the processor, a set of virtual network functions needed for providing the service to the user endpoint device in accordance with the policy for providing the service, wherein the determining the set of virtual network functions is performed in accordance with at least one policy for providing at least one virtual network function of the set of virtual network functions, wherein the at least one policy is received from the home network of the user endpoint device, wherein a respective policy of the at least one policy for providing the at least one virtual network function of the set of virtual network functions establishes, in accordance with a plurality of ranges specifying numbers of concurrently attached user endpoint devices attached at a location of the user endpoint device in the visited network, how one or more of the at least one virtual network function is to be instantiated or modified, wherein each of the plurality of ranges specifies a distinct set of concurrently attached user endpoint devices;

granting, via the processor, the attach request or the handover;

designating, via the processor, for each virtual network function of the set of virtual network functions that is needed for providing the service, a corresponding virtual network function of the visited network for serving the user endpoint device at the location of the user endpoint device in the visited network; and providing, via the processer, the service to the user endpoint device via the set of virtual network functions that is designated.

2. The method of claim 1, wherein the determining the set of virtual network functions further comprises:

determining for each virtual network function of the set of virtual network functions that is needed for providing the service, whether a corresponding existing virtual network function is available for providing the service to the user endpoint device at the location of the user endpoint device; and instantiating a new virtual network function or modifying the corresponding existing virtual function for each virtual network function of the set of virtual network functions that is needed for providing the service, when the corresponding existing virtual network function is determined as being unavailable.

3. The method of claim 1, wherein the policy for providing the service is at a level selected from at least one of: an international mobile subscriber identity series level, a public land mobile network level, and an access point name level.

4. The method of claim 1, wherein the policy for providing the service comprises an indication as to how traffic to and from the user endpoint device is to be treated.

5. The method of claim 4, wherein the indication is based on one or more of: a type of user associated with the user endpoint device, a type of service being accessed, and a quality of service requirement.

6. The method of claim 2, wherein the instantiating is performed in accordance with the at least one policy for providing the at least one virtual network function received from the home network of the user endpoint device.

7. The method of claim 6, wherein the determining whether the corresponding existing virtual network function is available is based on the location of the user endpoint device, the policy for providing the service, and the at least one policy for providing the at least one virtual network function received from the home network of the user endpoint device.

8. The method of claim 6, wherein the at least one policy for providing the at least one virtual network function and the policy for providing the service are stored in a central repository.

9. The method of claim 6, wherein the at least one policy for providing the at least one virtual network function and the policy for providing the service are configurable in a network element of the first wireless service provider.

10. The method of claim 6, wherein the at least one policy for providing the at least one virtual network function comprises one or more of: a parameter for triggering an instantiation of the new virtual network function, a parameter for triggering a modification of the corresponding existing virtual network function, a threshold for triggering the instantiation of the new virtual network function, a threshold for triggering the modification of the corresponding existing virtual network function, a parameter to be provided to a network element that performs an orchestration of a virtual network function, and a threshold to be provided to the network element that performs the orchestration of the virtual network function.

11. The method of claim 6, wherein the at least one policy for providing the at least one virtual network function is based on an attribute of the service provided to the user endpoint device.

12. The method of claim 6, wherein the at least one policy for providing the at least one virtual network function comprises a plurality of policies, wherein each policy of the plurality of policies is established for respective ranges of respective numbers of concurrently attached user endpoint devices at the location of the user endpoint device.

13. The method of claim 6, further comprising: receiving, via the processor, a request for an update from the home network of the user endpoint device, wherein the request is for updating the at least one policy for providing the at least one virtual network function or the policy for providing the service;

performing, via the processor, the update in accordance with the request; and notifying, via the processor, the home network of the user endpoint device that the updating is performed.

14. The method of claim 1, wherein each virtual network function of the set of virtual network functions that is needed for providing the service comprises one or more of: a virtual serving gateway, a virtual packet data network gateway, a virtual policy and charging rule function, a virtual domain name server, and a virtual mobility management entity.

15. The method of claim 2, wherein the instantiating is performed in a data center associated with the first wireless service provider.

16. The method of claim 2, wherein the instantiating is performed via an orchestrator or a unified element management system.

17. A non-transitory computer-readable storage device storing a plurality of instructions which, when executed by a processor of a visited network, cause the processor to perform operations, the operations comprising:

receiving an attach request or a handover for a user endpoint device, wherein the visited network is operated by a first wireless service provider;

determining a home network for the user endpoint device, wherein the home network is operated by a second wireless service provider;

receiving a profile of the user endpoint device;

determining a policy for providing a service to the user endpoint device in accordance with the profile of the user endpoint device;

determining a set of virtual network functions needed for providing the service to the user endpoint device in accordance with the policy for providing the service, wherein the determining the set of virtual network functions is performed in accordance with at least one policy for providing at least one virtual network function of the set of virtual network functions, wherein the at least one policy is received from the home network of the user endpoint device, wherein a respective policy of the at least one policy for providing the at least one virtual network function of the set of virtual network functions establishes, in accordance with a plurality of ranges specifying numbers of concurrently attached user endpoint devices attached at a location of the user endpoint device in the visited network, how one or more of the at least one virtual network function is to be instantiated or modified, wherein each of the plurality of ranges specifies a distinct set of concurrently attached user endpoint devices;

granting the attach request or the handover;

designating for each virtual network function of the set of virtual network functions that is needed for providing the service, a corresponding virtual network function of the visited network for serving the user endpoint device at the location of the user endpoint device in the visited network; and providing the service to the user endpoint device via the set of virtual network functions that is designated.

18. The non-transitory computer-readable storage device of claim 17, wherein the determining the set of virtual network functions further comprises:

determining for each virtual network function of the set of virtual network functions that is needed for providing the service, whether a corresponding existing virtual network function is available for providing the service to the user endpoint device at the location of the user endpoint device; and instantiating a new virtual network function or modifying the corresponding existing virtual function for each virtual network function of the set of virtual network functions that is needed for providing the service, when the corresponding existing virtual network function is determined as being unavailable.

* * * * *